United States Patent [19]
Camillone et al.

[11] Patent Number: 5,421,011
[45] Date of Patent: May 30, 1995

[54] METHOD AND SYSTEM FOR ACCESS AND ACCOUNTING CONTROL IN A DATA PROCESSING SYSTEM BY USING A SINGLE RESOURCE ACCOUNT FOR A USER OR A GROUP OF USERS

[75] Inventors: Nicholas A. Camillone; Douglas H. Steves; Kendall C. Witte, all of Austin, Tex.

[73] Assignee: International Business Machines Corporation, Armonk, N.Y.

[21] Appl. No.: 810,986

[22] Filed: Dec. 20, 1991

[51] Int. Cl.⁶ .................................... G06F 12/14
[52] U.S. Cl. ........................ 395/650; 364/DIG. 1; 364/281.6; 395/725
[58] Field of Search ............. 395/600, 650, 700, 725

[56] References Cited

U.S. PATENT DOCUMENTS

| | | | |
|---|---|---|---|
| 4,432,051 | 2/1984 | Bogaert et al. | 395/550 |
| 4,481,583 | 11/1984 | Mueller | 395/725 |
| 4,890,227 | 12/1989 | Watanabe et al. | 395/800 |
| 5,018,060 | 5/1991 | Gelb et al. | 395/600 |
| 5,210,872 | 5/1993 | Ferguson et al. | 395/650 |
| 5,265,249 | 11/1993 | Kumamoto | 395/650 |

FOREIGN PATENT DOCUMENTS 63070342  3/1988  Japan.
03252824  11/1991  Japan.

OTHER PUBLICATIONS

*Software –Practice and Experience*, vol. 20, No. 5, May 1990, "Collaboration Using Roles", M. Bishop, pp. 485–495.

*Communications Networks*, London UK, Sep. 1975, "Maximizing System Performance by Optimizing Scheduling and Accounting Algorithms", I. A. Newman et al., pp. 549–565.

K. Shimizu et al., "Hierarchical Object Groups in Distributed Operating Systems", 8th International Conference on Distributed Computing Systems, IEEE, cat. #88CH2541-1 Jun. 1988, pp. 18–24.

M. G. Fugini et al, "An Extension to UNIX Protection Mechanisms to Support Flexible Resource Sharing and Discretionary Authorization", University of Brescia and Politecnico di Milano and University of Milano, Italy, pp. 663–661 no date.

R. Rashid et al., "Mach A System Software Kernel", Digest of Papers, IEEE Computer Society International Conference, Spring, 1989, IEEE cat. #89CH2686-4, pp. 176–178.

R. J. Norcross, "A Control Structure for Multi-Tasking Workstations", Proceedings-1988 IEEE, Internat'l Conf. on Robotics and Automation, pp. 1133–1135.

C. M. Davidson, "Note on Concurrent Programming Control", IEEE Transactions on Software Engineering, vol. SE-13, No. 7, Jul. 1987, pp. 865–866.

K. F. Li, "Support for Distributed Data Structures in the Homogeneous Multiprocessor", Second International Conf. on Computers and Applications, 1987, IEEE cat. #87CH2433-1, pp. 104–110.

R. P. Hughes, "The Transparent Remote File System", Integrated Solutions, Inc., USENIX Assoc., 1986, pp. 306–317.

B. Wijnen, "Shared DASD Facility for VM/SP Resource Control on European HONE", Proceedings of the SEAS Spring Mtg. 1985, Veldhoven, Netherlands, pp. 503–529.

Shimizu et al., "Hierarchical Object Groups in Distributed Operating Systems", 8th International Conference on Distributed Operating Systems, IEEE Cat #88CH2541-1, Jun. 1988, pp. 18–24.

*Primary Examiner*—Thomas G. Black
*Assistant Examiner*—John Loomis
*Attorney, Agent, or Firm*—Mark S. Walker; Wayne P. Bailey

[57] ABSTRACT

Disclosed is a method and system for allowing resource control in a UNIX-based system to be done on an aggregate, or group, basis. This enables both access control and accounting to be done in units of groups instead of units of users. This design is upwardly compatible with the current implementation which does resource allocation and accounting in units of users. In addition, the method and system provides greater flexibility in selecting the system availability policy to be enforced. A resource quota scheme is introduced wherein a pooled resource account allows a system administrator to segregate processes into critical/non-critical classifications.

6 Claims, 3 Drawing Sheets

METHOD AND SYSTEM FOR ACCESS AND ACCOUNTING CONTROL IN A DATA PROCESSING SYSTEM BY USING A SINGLE RESOURCE ACCOUNT FOR A USER OR A GROUP OF USERS

TECHNICAL FIELD

This invention is in the field of data processing systems, and more specifically relates to a resource access and accounting control system for a multiprocessing environment.

BACKGROUND ART

The invention to be described hereinafter was implemented in a version of the UNIX[1] operating system. The UNIX operating system was developed by Bell Telephone Laboratories, Inc., for use on a Digital Equipment Corporation minicomputer, but has become a popular operating system for a wide range of minicomputers and, more recently, microcomputers and workstations. For more information on the UNIX operating system, the reader is referred to *UNIX System, User's Manual, System V*, published by Western Electric Co., January 1983, are hereby incorporated by reference as background material. A good overview of the UNIX operating system is provided by Brian W. Kernighan and Rob Pike in their book entitled *The UNIX Programming Environment*, published by Prentice-Hall (1984) and a book by Maurice J. Bach, Design of the UNIX Operating System, published by Prentice-Hall (1986), both hereby incorporated by reference as background material. Other versions of the UNIX operating system have been developed by others, including one developed by the Univ. of California at Berkeley known as the Berkeley version, and one developed by IBM Corporation known as AIX[2].

Resource access and accounting controls allow system administrators to grant resource access and to audit resource usage in UNIX compatible operating systems. Resources can be either physical or logical. Physical resources include disk space, communication lines and processing time. Logical resources include communications buffers, file system buffers, processes and paging space. Note that all logical resources ultimately are implemented in terms of physical resources.

It is important in many systems to control or audit resource usage. Resource usage needs to be controlled if the system administrator wishes to guarantee system availability. For instance, critical processes such as a process controlling reactor parameters in a nuclear Dower plant must run at a certain time or certain safety rules will be violated. A malicious process running on the same system could use up all of the process table slots in the system and prevent the initiation of the critical process. Controls which limit the amount of a resource which can be consumed by some entity (process/user/project) are usually termed quotas.

Normally, UNIX systems offer little, if anything, in terms of a quota system to control resource usage. The Berkeley Software Distribution (BSD) version of UNIX provides disk quotas which allow system administrators to allocate disk space to specified users. BSD UNIX also process a way to limit resource consumption by a process. These controls limit processing time, maximum file size, core file size, memory usage, process stack size and process data segment size. These controls, however, are not really quotas. Since there is usually no limit on the number of processes which can be created by a user, a user can consume unlimited amounts of these resources simply by creating a lot of processes. Even when there is a limit on the number of processes, it is usually not effective in controlling resource consumption. UNIX is a "process-based" system where most tasks are accomplished with separate processes, so that a user who "multi-tasks" requires a lot of concurrent processes. This tends to make per-process limits ineffective.

Resource usage needs to be audited if the system administrator wishes to charge for the use of the system. For instance, many organizations maintain centralized computers serving many different departments. These computers are often specialized machines such as supercomputers. The cost of purchasing, maintaining and operating these computers is recovered from the individual departments according to their usage. The auditing of resource usage in a computer system is usually termed accounting.

UNIX systems include a complete accounting subsystem which allows resource usage to be tracked on a per user basis. Audited resources include processing time, input/output subsystem utilization, memory usage and printer usage.

A central problem with both the UNIX quota and accounting subsystems is that the unit of allocation and accountability is the user. This reflects the research and academic environment where UNIX originated. In these cases, people work more on an individual basis, so it is natural that resource controls would be done in this same unit. But commercial and industrial organizations normally work on a group or project basis, and so the UNIX facilities are inadequate in these environments.

Quota systems, in general, have the unfortunate characteristic that they tend to partition the system resources. For instance, if there are 10,000 process table slots (determining the maximum number of processes) and there are 100 resource accounts on the system, then an obvious approach is to grant 100 process table slots to each account. However, most resource accounts are not used all the time, and so the system would be underutilized except at peak times. The system administrator could grant more than 100 processes to each account, of course, but then there would be no effective guarantee that the resource would be available.

One approach to this problem is to allow processes to exceed their quotas if there is no contention for the requested resource, but to relinquish such resources once contention exists. For instance, a process could be granted as many of the communication buffers as it requested as long as buffer usage was less than 50%. This scheme has two problems. First, it does not work with persistent resources, such as filesystem space. Second, there is no clean way for a process to simply relinquish resources in a UNIX system (e.g. communication buffers are requested on behalf of the process, and not directly by the process, and cannot be freed at some arbitrary point). As a result, the resources can only be regained by terminating the process.

SUMMARY OF THE INVENTION

The disclosed design addresses these shortcomings by providing that resource controls can be done on either a group or an individual basis. The unit of resource control is the account, which can include one or more users. In addition, users can be assigned more than one account. When users log into the system, they can either select which resource account they will be using or can simply use their default account. All processes created after login will include the identifier of this account, unless the user changes accounts in the middle of the session.

System administrators are responsible for assigning users to accounts and granting quotas for each account. Any user who is assigned to an account may use the resources granted to that account. Quotas are managed as they are in the current UNIX system implementations, except that the account identifier is used instead of the user identifier to determine if a resource request will be granted. For instance, the file control block is modified to include an account identifier and this account is charged for the disk usage of that file.

The format of an accounting record is modified to include the resource account identifier for the process, and the accounting utilities are modified to track and display this identifier.

Upward compatibility is provided in one of two ways. First, the system administrator can choose not to create and assign resource accounts at all. In this case, users implicitly belong to a single account whose identifier is the same as their user identifier. At login time, the login program will detect that no accounts have been created and set the process account identifier to the identifier of the new login user.

Second, system administrators can create individual resource accounts for each user, and set the account identifier to the user's identifier. This method allows for a graceful transition to a full-fledged group accounting scheme, since existing quota records would not need to be altered.

The disclosed design addresses the partitioning problem in the following way. There is a distinguished resource account known as the "pool" account. All users implicitly belong to the pool account, and the system administrator can assign quotas to this account. If a process requests a resource and the quota for that resource for the process's current account is exhausted, the process can draw on the pool account's quota. A record is maintained of the number of pool resources used by each account, and when a process releases a resource for which its account has outstanding pool resources, the pool is credited with the resource. This scheme addresses the partitioning problem, in part, and is particularly effective on those systems for which only a subset of the processes are critical processes which need guaranteed resource availability. In these systems, the administrator would assign the accounts used to run the critical processes the necessary resource, and then assign the remainder to the pool account. Normal processes would compete for resources from the pool account, while critical processes would be guaranteed the necessary resources.

The partitioning problem is only partially addressed because partitioning can still occur. If processes X, Y, & Z all require 100 of some resource Q of which the system only has 300, the system administrator must partition the resources if these processes are to run concurrently. The pool approach allows the administrator to separate processes into critical and non-critical. Critical processes must be allocated their full resource requirement. Non-critical processes do not have this requirement, and so can "share" the pool. If the non-critical processes are delayed or fail due to resource denial, that is acceptable. Thus, critical processes can still cause resource partitions, whereas non-critical processes do not.

A possible criticism of this design is that it creates a new entity—namely resource accounts—when the existing group mechanism would have served the same purpose. This, however, is not true. Groups are used for discretionary access control in UNIX. Adding a user to a group gives that user the same access rights as the other users in the group. This, however, is not the same policy as is being addressed with resource controls. Resource controls address system availability, while discretionary access controls are concerned with the integrity and non-disclosure of information which is kept on the system. Doing resource control in terms of groups would require that these policies not be separately enforceable on the system. It would also be difficult to provide compatibility, since group identifiers are already assigned on existing systems and conflict with existing user identifiers in many cases.

It is therefore an object of the present invention to provide an improved multiprocess data processing system.

It is a further object of the present invention to provide an improved resource control mechanism in a data processing system.

It is a further object of the present invention to provide an improved resource control mechanism in a UNIX-compatible operating system.

It is yet another object of the present invention to provide an improved resource control allocation mechanism in a data processing system.

BRIEF DESCRIPTION OF THE DRAWING

The foregoing and other objects, aspects and advantages of the invention will be better understood from the following Best Mode for Carrying Out the Invention with reference to the figures listed below, in which.

BEST MODE FOR CARRYING OUT THE INVENTION

Figure 1:
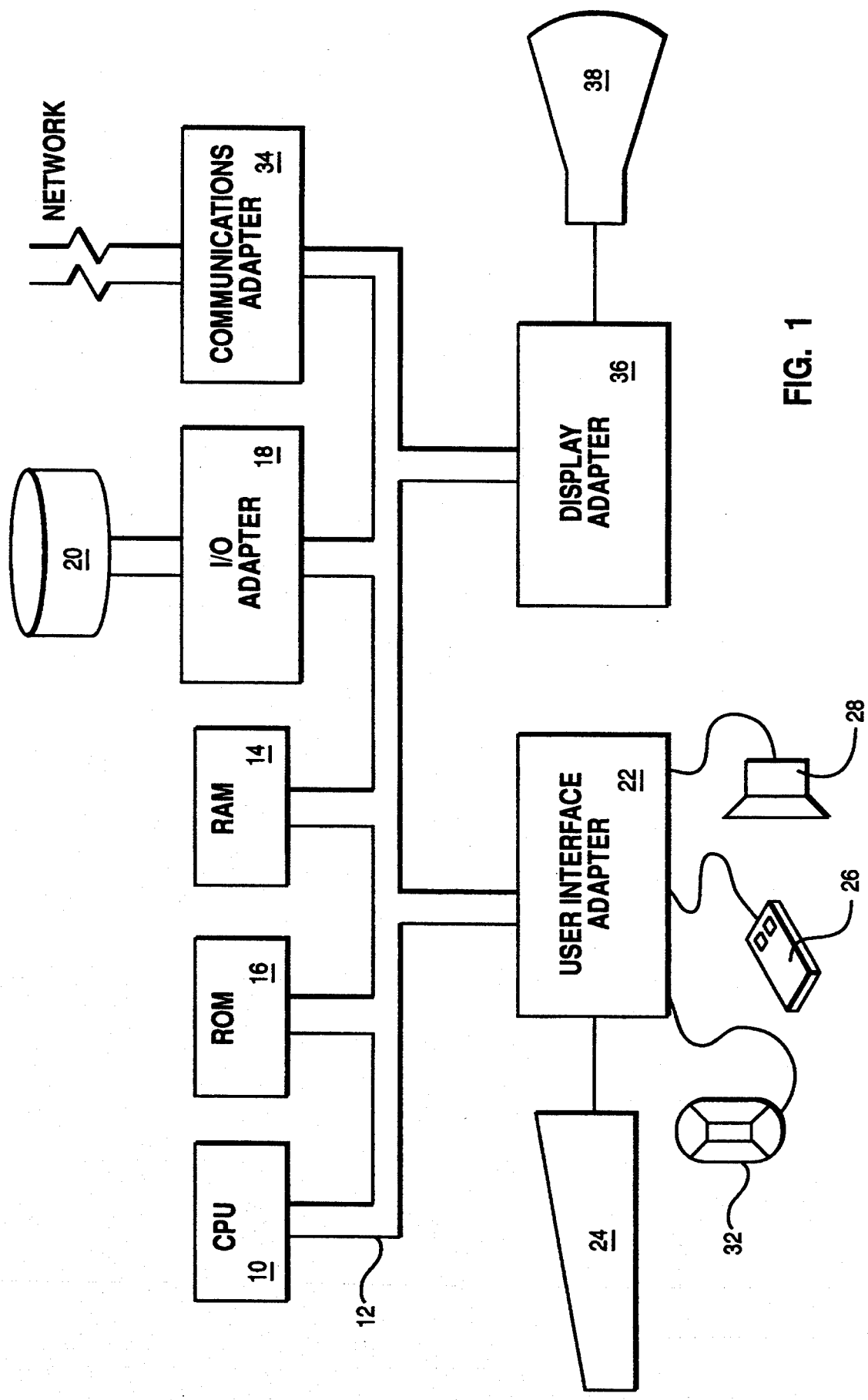
FIG. 1 details components and resources of a data processing system.

A conventional data processing system as shown in FIG. 1 operates using the UNIX, or equivalent, operating system in the preferred embodiment. This data processing system has a central processing unit 10, read only memory 16, random access memory 14, input/output adapter 18, user interface adapter 22, display adapter 36, and communication adapter 34 interconnected via a common bus, or data path, 12. The input/output (I/O) adapter 18 provides an interface between I/O devices, such as a direct access storage device (DASD) 20, and the bus 12. The user adapter 22 similarly provides an interface between user devices (such as a keyboard 24, trackball 32, mouse 26 and speaker 28) and the bus 12. Text, graphics, and images are displayed on display 38, which also uses a display adapter 36 to allow access to the bus 12. In UNIX operating systems, a filesystem having particular files defining system setup and operation are maintained in the DASD at 20 in the preferred embodiment. Other embodiments might eliminate the local DASD 20, and access a remote filesystem on a network through the communication adapter 34. The same method and system defined below would be equally applicable to either types of DASD location.

Altering a UNIX operating system to allow for accounting groups, used for aggregate resource accounting and control, requires three major alterations. The three areas to be modified are generally known as credentialing, auditing, and access control. The alterations to these areas include combinations of the following—adding new commands, which are stored in the filesystem and loaded into memory upon command execution; adding new subroutines, which are stored in system libraries and loaded into memory upon reference by command; adding new system objects which are defined in new files (user database); and modifying data structures for the kernel user block, kernel accounting record, and filesystem inode (both on disk and in core memory).

Credentialing

Figure 2:
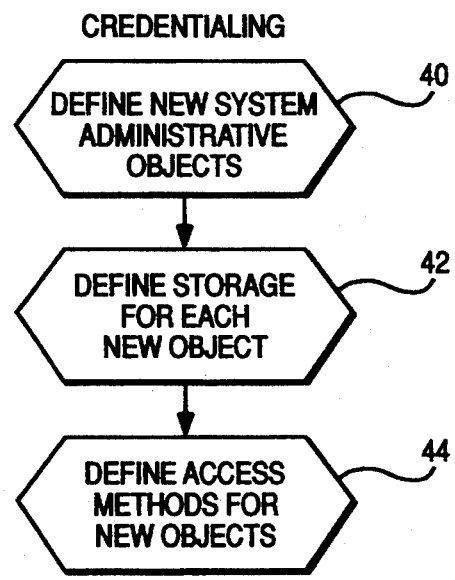
FIG. 2 shows the steps involved for modifying credentialing in a data processing system operating system.

Credentialing involves assigning users the credentials (in this case, account IDs) that will be used to account for, and control, access to resources in order to implement an availability policy. First, a new class of administrative object is defined at 40 of FIG. 2 to allow for the addition of accounting groups as administrative entities. These objects have five attributes:

name (Data Type: Character String) defines the name by which the accounting group is known at the command level.

identifier (Data Type: Cardinal (unsigned long) defines the name by which the accounting group is known at the kernel level members (Data Type: List of Character Strings) defines the system users who belong to the accounting group.

administrators (Data Type: List of Character Strings) defines the system users who can administer the accounting group (by adding/deleting members and administrators). Defined security administrators can normally also perform this function.

admin (Data Type: Boolean) defines the accounting group as administrative, which means that security administrators may not administer this group.

Figure 3:
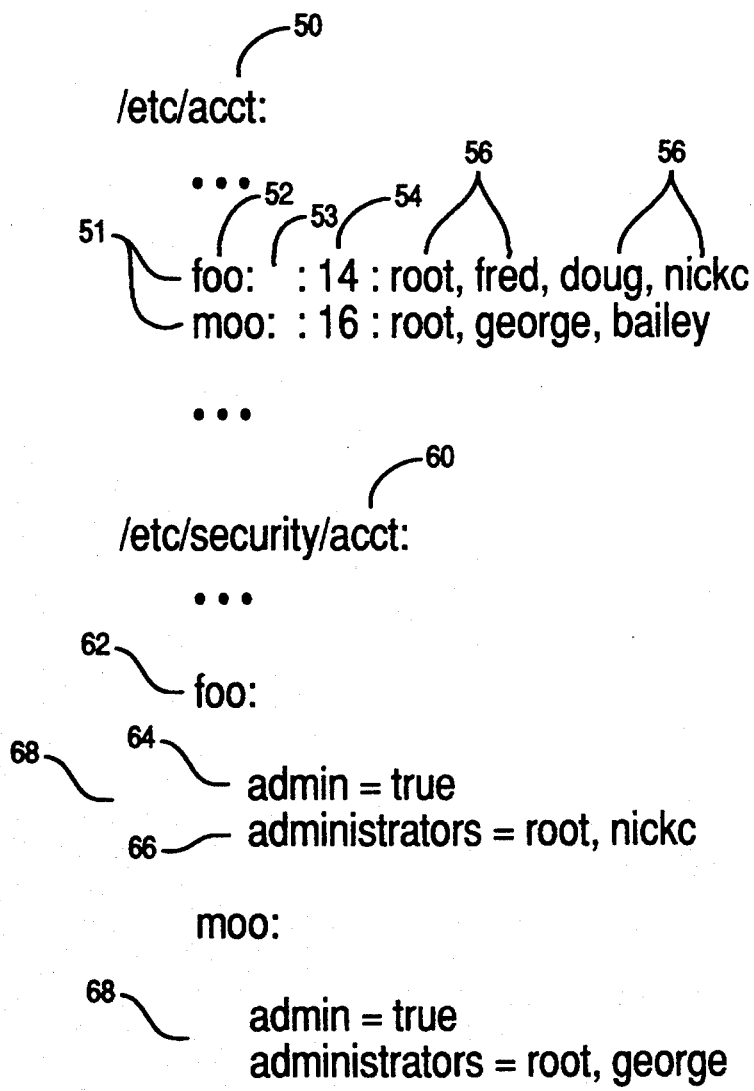
FIG. 3 shows the file structure for system administrative objects.

This information is stored in two files: /etc/acct and /etc/security/acct, as shown in FIG. 3. /etc/acct 50 will contain the account (acct) name, identifier and members attributes, and will include each acct name in the system. Each acct name 51 is defined on a separate line, and fields are colon separated, as in the /etc/passwd and /etc/group files of a conventional UNIX system. The first field is the acct name 52, the second field is left blank at 53, the third field is the acct ID 54 and the fourth field lists the members 56. Each member name is separated with a comma and arbitrary amounts of white space (blanks or tabs only). /etc/security/acct 60 contains the name 62, administrators 66 and admin attributes 64. Each acct 51 has its own stanza 68. The stanza format is conventional, as is used in the /etc/security/group file in the UNIX filesystem.

To access this new object class, new commands and subroutines are defined. The new commands include:

mkacct
    Creates a new accounting group rmacct
    Deletes an existing accounting group chacct
    Alters one or more attributes of an accounting group lsacct
    Queries one or more attributes of an accounting group The new subroutines include:

setacctdb
    Opens the database which contains the accounting group objects getacctattr
    Queries the value of an accounting group attribute setacctattr
    Alters the value of an accounting group attribute endacctdb
    Closes the database which contains the accounting group objects nextacct
    Returns the name of the next accounting group, in a linear search Table 1 shows pseudo-code which would allow a person of ordinary skill in the art how to implement the above described commands and subroutines.

TABLE 1

```
Pseudo-code for mkacct:
    verify proper privilege
    if (acct already exists)
        return EEXIST;
    if (administrative flag)
        assign administrative ID (id <
        200)
    else
        assign normal ID (id >= 200)
    append new acct name/id in /etc/acct
        file
    append new acct name in
        /etc/security/acct
    if (administrative flag)
        set admin = true in
        /etc/security/acct
    if (admin init flag)
        add real user to administrators
        field in
        /etc/security/acct
    write audit record
Pseudo-code for rmacct:
    Verify proper privilege
    if (acct doesn't exist)
        return ENOENT
    remove stanza from /etc/security/acct
    remove line from /etc/acct
    write audit record
Pseudo-code for chacct:
    verify proper privilege
    if (acct doesn't exist)
        return ENOENT
    perform requested alterations
    write audit record
Pseudo-code for lsacct:
    if (acct doesn't exist)
        return ENOENT
    read requested information
    format info according to flags
    display info
    write audit record
Pseudo-code for setacctdb:
    open the database files
        (/etc/security/acc, /etc/acct)
        and lock in request mode
    return a handle which can be translated
    to the descriptors for those files
Pseudo-code for getacctattr:
    search the appropriate file for the
        named attribute/acct
    read the information into a temporary
        buffer
    perform any format conversions
        requested
    return the data to the user
```

TABLE 1-continued

```
Pseudo-code for setacctattr:
    search the appropriate file for the
        named attribute/acct
        format the information as appropriate
            (convert ints to strings, etc)
        set the information in a local buffer
        sync the databases if requested
Pseudo-code for endacctdb:
    sync the databases if requested
    close all database files
    release all local storage
Pseudo-code for nextacct:
    set the current search position in
        /etc/acct
    return the 'next' acct name
        (make sure to parse the NIS markings
        correctly, and to read from NIS
        where appropriate)
```

Auditing

Figure 4:
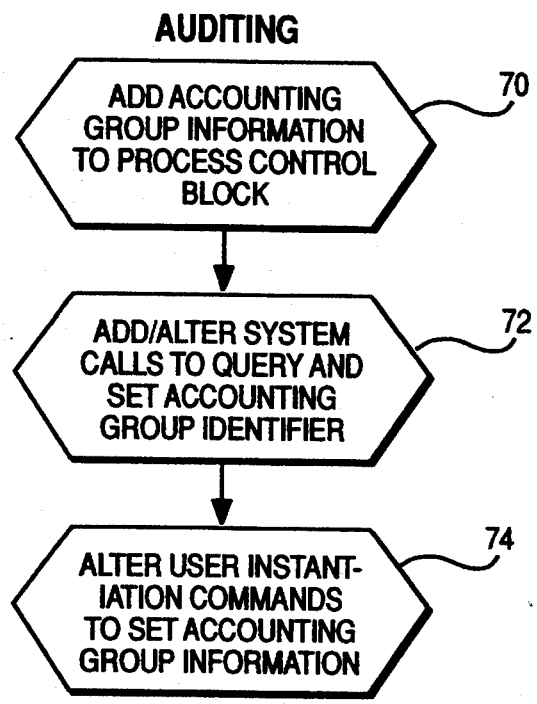
FIG. 4 shows the steps involved for modifying auditing in a data processing system operating system.

Auditing is an accounting subsystem which records the resources that were used by each user. The standard UNIX System V accounting subsystem is changed as follows, and in reference to FIG. 4. Accounting group information is added to the process control block at 70, so that quotas and resource accounting may be performed for each process. To do this, an accounting group identifier is added to the credentials data structure, logically contained within the per-process user block. This field is named cr_acctid and is of type uid_t. This is similarly shown in Table 3.

Additionally, system calls are added/altered to allow this identifier to be queried or set at 72. In the preferred embodiment, the AIXv3 system calls setuidx() and getuidx() were changed so that the accounting group identifier could be set and queried, respectively, with these existing calls. These calls take a manifest constant as a parameter to specify which userid to get/set. The addition/alteration includes adding a new manifest constant, namely "id_acct" in the sys/id.h file, which is then used in these calls to specify the accounting ID using conventional programming techniques.

Lastly, the user instantiation commands are altered at 74 to correctly set this information when the user begins a new session (via login, rlogin, rsh, ftp, et cetera). This is done by altering the subroutine setpcred() to query the accounting group database and to set the appropriate accounting group with the setuidx() system call. setpcred() is altered such that it queries the user database for the default account for a user at login, using the getuserattr() routine. setpcred() then sets this value in the process credentials, using setuidx(id_acct, value). At session reset (sv, setacct), the setpcred() routine alters this attribute correctly when required (setacct) and resets it implicitly (sv). Since the user instantiation commands all use this subroutine to establish the user's credentials, this guarantees that the accounting group identifier is always established correctly for each process.

Table 2 shows pseudo-code which would allow a person of ordinary skill in the art how to implement the above described commands and subroutines.

TABLE 2

```
Pseudo-code for setpcred:
setpcred(user, credentials)
    setpcred() establishes the credentials
        for a process.
    setpcred takes 2 parameters, the user name
        and an array of credentials. Each entry in the
```

TABLE 2-continued

```
    credentials array consists of a credentials
        type and credentials value.
setpcred() operates in three modes.
    INIT:       sets all process credentials for the
                current process by querying the user
                database for the credentials for the
                specified user. In this mode, the
                caller specifies only a user. The
                credential argument must be NULL.
                This mode is used at login time
                (login, cron).
    RESET:      sets all process credentials for the
                current process. The credentials for
                the specified user are queries from
                the user database *only* if that
                credential is not supplied as part of
                the credentials string. This mode is
                used at session reset (su, newgroup,
                setacct, setgroups)
    AUGMENT:    sets only specified credentials. The
                user argument must be NULL. All the
                credentials specified in the
                credentials string are changed to the
                parameter values. This mode is used
                to restart a session (at).
The pseudo code for setpcred():
BEGIN
    if (user && credentials)
        mode = RESET
    else if (user)
        mode = INIT
    else if (credentials)
        mode = AUGMENT
    else return (EINVAL)
    if (!privileged) return EPERM
    allocate temporary credentials structure
        (tmppcred)
    tmppcred = current process credentials /* ini-
        tialize at current state */
    if (mode == RESET || mode == INIT)
        tmpcred = getusercredentials(user) /* read the
            user database */
    if (mode == RESET || mode == AUGMENT)
        for each credential.type in credentials do
            tmpcred.type.value = credential.value /* set
                any augmented values */
    current process credentials = tmpcred
    free tmpcred
```

As a convenience feature for the user, the setacct() command was added which allows the user to reset the accounting group in the middle of a session. This allows the user to change accounts so that resource utilization is always changed against the project upon which the user is working.

Access Control

Access control is performed by the quota subsystem which permits or denies access to resources based upon assigned quotas. The conventional UNIX disk quota subsystem operates as follows, and is further described in "UNIX System Manager's Manual, Section 4—Disk Quotas in a UNIX Environment" (a part of the USENIX Association UNIX manual set), and hereby incorporated by reference as background material. There is a file per filesystem (called quota) which contains the quota for each user ID on the system. This file also contains the current allocation for each user. At boot time, this file is manually synchronized with the filesystem (basically, the allocation quantities are reset by reading each inode in the filesystem and adding up all the disk space consumed by a user).

This file is then "fed" to the kernel which uses this information to set up disk quota control blocks in the kernel for each user ID. Thereafter, when disk space is allocated or freed, the quota subsystem is informed and the current allocation for that user is adjusted. If the user is over quota (for an allocation request), the request is denied (the quota implementation also contains soft limits which are used to provide warnings, but they are not of interest here).

Figure 5:
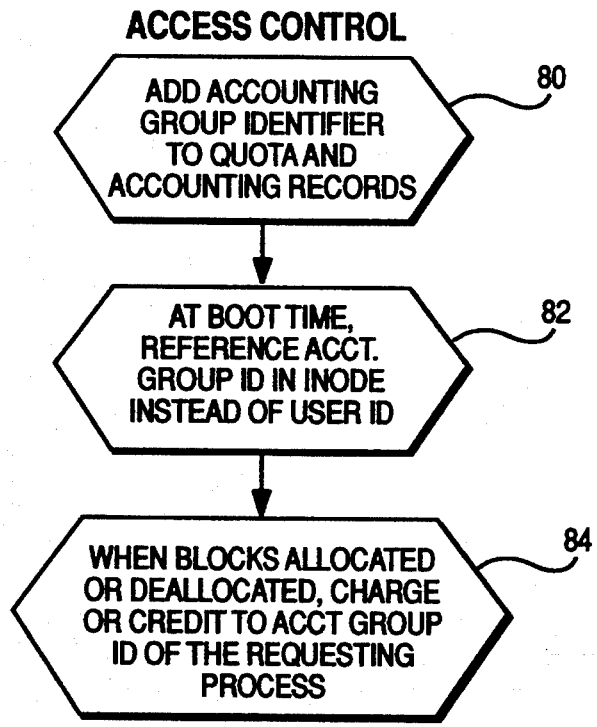
FIG. 5 shows the steps involved for modifying access control in a data processing system operating system.

The above subsystem is modified as follows, and in reference to FIG. 5. This present invention includes making three modifications to this quota subsystem to support resource accounting groups. First, the ID's in the quota file will be accounting group IDs. This necessitates modifying the command (edquota) which modifies this file to use accounting group IDs and names instead of user IDs and names. The accounting group identifier is added to the quota and accounting records at 80 so that these functions are properly performed.

Second, at boot time, the quota subsystem must reference the accounting group ID in the inode instead of the user ID at 82, in order to build the disk quota control blocks. To the acct structure, the field ac_acct is added (of type uid_t). This field is filled in by the acctexit() subroutine in the kernel, which fills in the other per-process information in the accounting record. To the on-disk inode structure (dinode), the field di_acct (of type uid_t) is added. To allow this information to be read, the field st_acct (of type uid_t) is added to the stat structure and the stat() system call is altered to fill this field in. The system call chacct() is added so that this field could be properly set. Table 3 further shows the modifications made to existing UNIX data structures.

TABLE 3
DATA STRUCTURE INFORMATION credentials:
    In sys/cred.h, add cr_acctid to the
    structure. This member is offset 20 bytes
    from the start of the current structure, and
    is 32 bits long.
    It is an atomic type (cardinal).
file status structure:
    In sys/stat.h, add st_acct to the structure.
    This member is offset 24 bytes from the
    start of the current structure, and is
    2 bits long.
    It is an atomic type (cardinal).
disk inode
    In jfs/ino.h, add di_acct to the structure.
    This member is offset 20 bytes from the
    start of the current structure, and is
    32 bits long.
    It is an atomic type (cardinal).
accounting record
    In sys/acct.h, add ac_acct to the structure.
    This member is offset 10 bytes from the
    start of the current structure, and is
    32 bits long.
    It is an atomic type (cardinal).

Third, when blocks are deallocated or allocated, the quota subsystem must credit or charge them to the accounting group ID of the requesting process at 84. This is achieved using conventional programming techniques for maintaining a credit/debit account. However, the distinction is in the use of the group ID instead of the user ID for any debits or credits.

The pool account implementation is as follows. First, there is a distinguished account ID (4G=2**32) for the pool (to which all users implicitly belong). Second, all quota control blocks contain a pool field to show how much of the current resource utilization for this ID has been allocated from the pool.

When a resource access request is made, it is satisfied if possible from the process's accounting group allocation. If not, and if the pool has available allocation, the request is satisfied and the pool's allocation (in its quota control block) is debited and the pool allocation in the quota control block for the process's accounting group is incremented. If the pool has no available resources, the request is denied.

When resources are deallocated, if the quota control block for the ID to which those resources were assigned has a positive pool allocation, this value is decremented and the resources are credited to the pool (the quota control block for the pool is used instead of that for the accounting group ID). Otherwise, the normal checks are used. Pseudo-code for the above pooling functionality is shown in Table 4.

TABLE 4

ALLOCATION:
    if resource access request
        if process acct group allocation
            available
            allocate from process acct group
            debit process acct group available
            count
        else if pool allocation available
            allocate from pool account
            debit pool allocation in quota
                control block
            increment process acct group in
                quota control block of
                pool acct
        else deny resource access request
    return
DEALLOCATION:
    if resource deallocation request
        if quota control block for process ID has
            pool allocation > 0
            decrement process ID quota control
                block
            credit quota control block of pool acct
        else
            process using normal non-pool method
    return In summary, the above described system is upwardly compatible from the standard BSD quota scheme which uses user IDs, and thus provides the system administrator with the flexibility to designate the unit of accountability: users or accounting groups or both. This system is also independent of the system discretionary access control. Finally, this system minimizes resource partitioning.

Resources in a non-UNIX operating system could similarly allow for allocating and maintaining such resources using techniques similar to those shown above for a UNIX-compatible resource.

While the invention has been particularly shown and described with reference to a preferred embodiment, it will be understood by those skilled in the art that various changes in form and detail may be made without departing from the spirit and scope of the invention.

We claim:

1. A method for controlling resource allocation in a data processing system having user identifiers, processes and resources, comprising the steps of:
    segregating system resources into a single pool and a plurality of group accounts;
    establishing a resource allocation account for each of said group accounts and said pool account, said account specifying resource control information including resource quotas for the account;
    assigning one or more of said user identifiers to said resource allocation group account;

testing a user process resource request against the specified resource control information for the group account to which said user identifier is assigned;

granting said resource request, if said request does not exceed resources available to said group account and decrementing group resources available by the amount granted;

testing said resource request against said pool account information, if said request exceed resources available to the resource allocation group account;

denying said resource request, if said request exceeds resources available to the resource allocation pool account; and granting said resource request, if said request does not exceed resources available to said pool account and decrementing pool resources available by the amount granted.

2. The method of claim 1 wherein said account is used to maintain system resource accounting information.

3. A method for modifying a UNIX compatible operating system, having credential, audit, and quota subsystems, to provide group resource control, comprising the steps of:

storing a plurality of administrative objects, each having group resource quota information, one of said administrative objects being a global pool object, said administrative objects being accessible to said credential subsystem;

assigning zero, one or more user identifiers to each administrative object other than said pool object;

providing said group resource quota information to said audit subsystem;

testing said group resource quota information for the assigned administrative object by said quota subsystem when allocating or deallocating resources for a process for a user identifier;

allocating or deallocating resources for said process if said quota is not exceeded;

testing said pool object group resource quota information, if said allocation or deallocation exceeds the group resource quota information for the assigned administrative object; and rejecting requests to allocate resources when said requests exceeds the pool object group resource quota information.

4. A system for controlling resource allocation in a data processing system having user identifiers, processes, and resources comprising:

means for segregating system resources into a single pool account and a plurality of group accounts;

means for establishing a resource allocation account for each of said group accounts and for said pool account, said account specifying resource control information including resource quotas;

storage means for storing said resource allocation accounts;

means for assigning zero, one or more user identifiers to each of said resource allocation accounts and resource allocation means for testing a user process resource request against the specified resource control information for the account to which said user identifier is assigned, granting the request and decrementing the resources available if the group account resources are available or, if account resources are not available, testing against the resource control information of said pool account, and denying said resource request if said request exceeds resources available to said pool account, or granting the request and decrementing the pool resources available if the request does not exceed available resources in said pool account.

5. The system of claim 4 wherein said account is used to maintain system resource accounting information.

6. A system for modifying a UNIX compatible operating system, having credential, audit, and quota subsystems, to provide group resource control, comprising:

means for storing administrative objects, having group resource quota information one of said administrative objects being a global pool object, said administrative objects being accessible to said credential subsystem;

means for assigning access methods to said administrative objects;

means for assigning zero one or more user identifiers to each administrative object other than said pool object;

means for providing said group resource quota information to said audit subsystem;

means for testing said group resource quota information for said assigned administrative object by said quota subsystem when allocating or deallocating resources for a process for a user identifier;

means for allocating or deallocating resources for said process if said quota is not exceeded;

means for testing said pool object group resource quota information, if said allocation or deallocation exceeds the group resource quota information for the assigned administrative object; and rejecting allocation requests that exceed available pool resource quotas.

* * * * *

UNITED STATES PATENT AND TRADEMARK OFFICE
CERTIFICATE OF CORRECTION

PATENT NO. : 5,421,011
DATED : May 30, 1995
INVENTOR(S) : Nicholas A. Camillone, Douglas H. Steves and Kendall C. Witte It is certified that error appears in the above-indentified patent and that said Letters Patent is hereby corrected as shown below:

Col. 12, line 34, after "zero", please insert --,--.

Signed and Sealed this

Twenty-fifth Day of June, 1996

Attest:

BRUCE LEHMAN

*Attesting Officer*  *Commissioner of Patents and Trademarks*